United States Patent
Yamaguchi et al.

(10) Patent No.: US 6,697,304 B2
(45) Date of Patent: Feb. 24, 2004

(54) METHOD AND APPARATUS FOR RECORDING WITH A MAGNETO-OPTICAL RECORDING MEDIUM

(75) Inventors: Atsushi Yamaguchi, Ogaki (JP); Naoyuki Takagi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/247,691

(22) Filed: Sep. 20, 2002

(65) Prior Publication Data

US 2003/0021192 A1 Jan. 30, 2003

Related U.S. Application Data

(62) Division of application No. 09/233,917, filed on Jan. 21, 1999, now Pat. No. 6,501,707.

(30) Foreign Application Priority Data

Jan. 23, 1998 (JP) .............................................. 10-11340

(51) Int. Cl.[7] .............................................. G11B 11/00
(52) U.S. Cl. ................................... 369/13.1; 369/13.54
(58) Field of Search ............................. 369/13.1, 13.41, 369/47.28, 14, 275.2, 122, 47.5, 53.34, 13.01, 47.35, 13.15, 13.17, 13.54, 116, 59.24, 13.02

(56) References Cited

U.S. PATENT DOCUMENTS

| | | | |
|---|---|---|---|
| 5,757,735 A | * 5/1998 | Fitzpatrick et al. | 369/13.54 |
| 6,240,056 B1 | 5/2001 | Tanase et al. | 369/47.28 |
| 6,246,640 B1 | 6/2001 | Shimazaki et al. | 369/13.1 |

* cited by examiner

*Primary Examiner*—Ali Neyzari
(74) *Attorney, Agent, or Firm*—Westerman, Hattori, Daniels & Adrian, LLP

(57) ABSTRACT

A magneto-optical recording medium includes a recording layer and a reproducing layer respectively formed by magnetic layers on a substrate. A record magnetic domain is formed within the recording layer by using a magnetic head, which is transferred into a reproducing layer by irradiating a laser beam upon reproduction. The physical length in recording a unit bit is taken as a unit domain length. Where the unit domain length is 1T and "1" is recorded in 1T, "1" is recorded in a former half 1T/2 and "0" is in a latter half 1T/2 by applying one period of an alternating magnetic field to the unit domain length.

1 Claim, 11 Drawing Sheets

LEAKAGE MAGNETIC
FIELD THROUGH
REPRODUCING LAYER

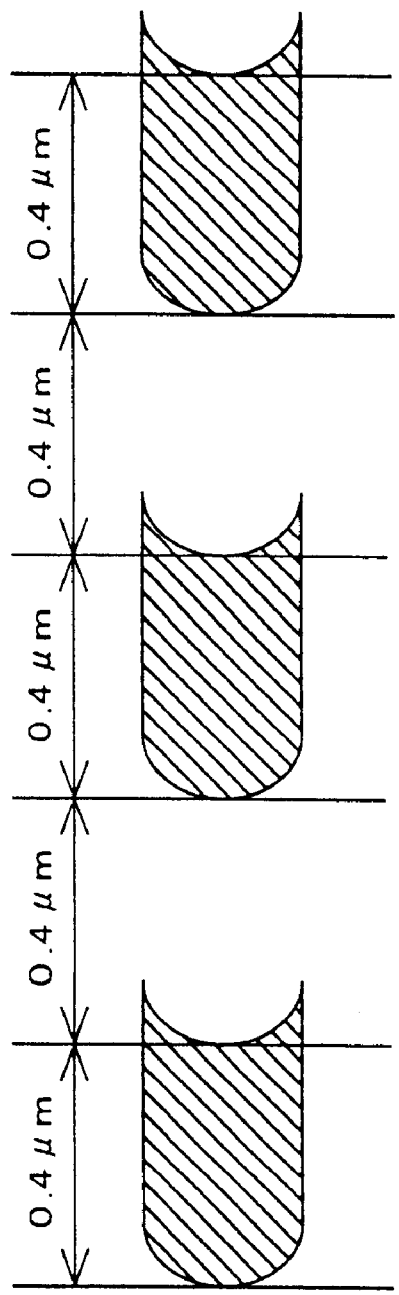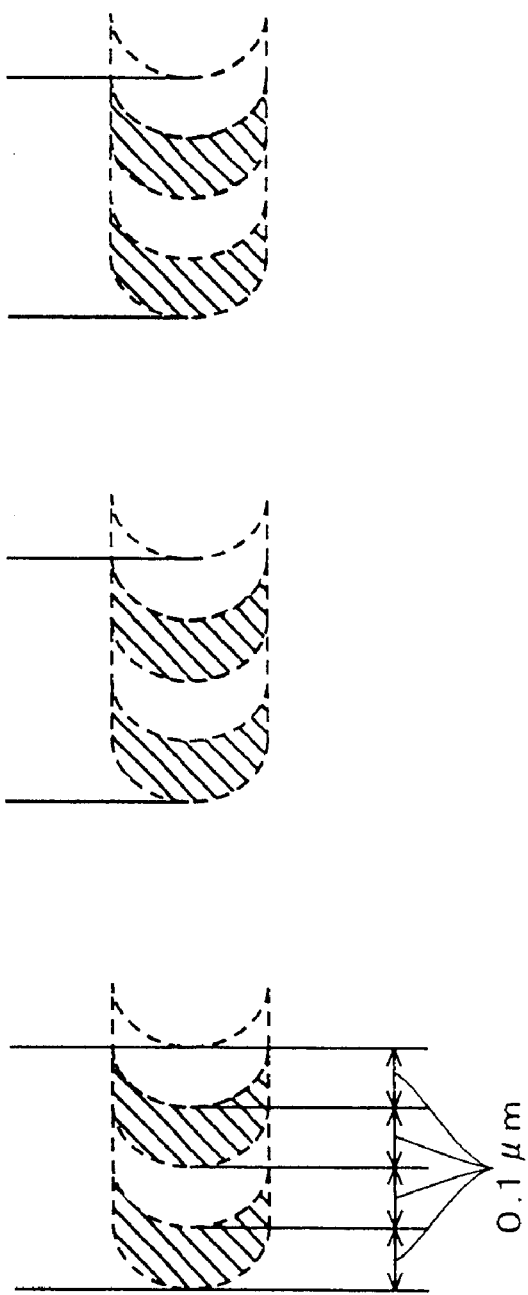
FIG. 13(A) PRIOR ART
FIG. 13(B)

METHOD AND APPARATUS FOR RECORDING WITH A MAGNETO-OPTICAL RECORDING MEDIUM

This application is a division of prior application Ser. No. 09/233,917 filed Jan. 21, 1999 now U.S. Pat. No. 6,501,707.

BACKGROUND OF THE INVENTION

1. Field of the Invention

The present invention relates to a method for recording with a magneto-optical recording medium. More particularly, the invention relates to a method and apparatus for recording with a magneto-optical recording medium, wherein the recording medium includes a recording layer and a reproducing layer for recording magnetic domains within the recording layer upon recordation and transfer of the record domains to the reproducing layer upon reproduction.

2. Description of the Prior Arts

The magneto-optical recording mediums and recording/reproducing apparatuses of this kind are disclosed, for example, in Japanese Patent Laying-open No. H6-295479 (Oct. 21, 1994) G11B 11/10, Japanese Patent Laying-open No. H8-7350 (Jan. 12, 1996) G11B 11/10, and so on.

The magneto-optical recording medium 10 includes, as shown in FIG. 1, a recording layer 14 and a reproducing layer 16 that are formed by a magnetic layer on a substrate 12. An intermediate layer 18 is formed between the recording layer 14 and the reproducing layer 16, while a protection layer 20 is provided on the recording layer 14. The intermediate layer 18, although formed herein by a non-magnetic layer, may be formed by a magnetic layer. Meanwhile, the recording layer 14 and the reproducing layer 16 may be formed by an arbitrary known magnetic material. Referring to FIG. 2, microscopic domains 22 can be recorded within the recording layer 14 of the magneto-optical recording medium 10 by using a magnetic head (not shown). During reproduction, the record domain 22 is transferred from the recording layer 14 to the reproducing layer 16 by irradiation of a laser beam 24 as shown in FIG. 3.

More specifically, a temperature profile is given in the magneto-optical recording medium 10 by irradiating the laser beam 24 as shown in FIG. 3. The temperature is highest at around a spot center and gradually decreases as an outer side is approached. Note that, in the case where the magneto-optical recording medium is for example a disc, the temperature profile is different in slant at between the front side and the rear side with respect to a moving direction of the magneto-optical recording medium. The temperature gradient is more abrupt at a region of the disc coming into a laser spot than that of a region going out of the laser spot. The magneto-optical recording medium 10 is increased in temperature at a desired point by utilizing such a temperature profile.

Returning to FIG. 2(A), if a laser beam 24 is irradiated to the magneto-optical recording medium 10, the magneto-optical recording medium 10 is increased in temperature to provide such a temperature profile as shown in FIG. 3. Here, the reproducing layer 16 is formed by a magnetic layer which is rich in transition metal and assumes a form of a magnetic thin film with perpendicular magnetization within a range from the room temperature to the Curie temperature Tc. As a consequence, the reproducing layer 16, if irradiated by a laser beam 24, is raised in temperature and decreased in coercive force. Due to this, the irradiation of the laser beam 24 causes the reproducing layer 16 to rise in temperature and hence decrease in coercive force, so that the record magnetic domain 22 of the recording layer 14 is transferred through the intermediate layer 16 to the reproducing layer 16 by the action of static magnetic coupling, thus forming a transferred magnetic domain 26 within the reproducing layer 16. The transferred magnetic domain 26 is formed at a position corresponding to the record magnetic domain 22.

After forming the transferred magnetic domain 26 within the reproducing layer 16, an external magnetic field Hep is applied by a not-shown magnetic head as shown in FIG. 2(B). This external magnetic field Hep is an alternating magnetic field. At least one period, preferably 2 to 4 periods, of an alternating magnetic field is applied during each time period that one magnetic domain passes through a hot spot 24a (see FIG. 3) caused by the laser beam 24. If an alternating magnetic field or external magnetic field Hep is applied in the same direction (same polarity) as that of the transferred magnetic domain 26, then the transferred magnetic domain 26 is increased in diameter to have enlarged magnetic domains 26a and 26b. As a result, transfer of the record magnetic domain 22 is effected with magnification. If a laser beam for reproduction is irradiated to the transferred magnetic domain 26 as well as to the enlarged magnetic domains 26a, 26b by using the optical head (not shown), reproduction is made of a magnetization state or record signals from the reproducing layer 16.

There is known one approach to realize high density recording, in the magneto-optical recording medium and recording/reproducing apparatus of this kind, wherein record magnetic domains are provided different in domain length 1T, 2T, 3T, ... , as shown in FIG. 4.

In this conventional recording method, however, there encounters variation in a state of a leakage magnetic field passing through the reproducing layer of the magneto-optical recording medium due to difference in domain length. Thus there has been a problem that the optimal reproducing condition is different for each domain length thus resulting in worsened reproducibility.

More specifically, if considering a long domain as shown in FIG. 5(B), the reproducing layer has a leakage magnetic field that is strong at a domain end P1 but weak at a domain central region P2. Meanwhile, through an outside point P3 of the domain is caused a leakage magnetic field in a direction opposite to that of the domain end P1. In such a state, if an external alternating magnetic field be applied, the leakage magnetic field at the domain outer point P3 acts to prevent the magnetic domain from being transferred into and enlarged within the reproducing layer to a satisfactory extent.

On the other hand, where the domain is excessively short as shown in FIG. 5(A), the leakage magnetic field is less distributed throughout the domain. There is also reduction in the opposite directional leakage magnetic field at the domain outer side area. Accordingly, the application of an external alternating magnetic field causes the magnetic domain to be transferred to and enlarged in the reproducing layer with sufficiency.

It is therefore difficult, for the conventional high-density recording method to record by varying the domain length, to obtain a reproduction characteristic with uniformity, because of uneven transfer and enlargement of the magnetic domains into and within the reproducing layer due to the difference in domain length.

SUMMARY OF THE INVENTION

It is therefore a primary object of the present invention to provide a method and apparatus for recording with the magneto-optical recording medium.

It is another object of the present invention to provide a method and apparatus for recording with a magneto-optical recording medium which can stably reproduce under a same condition signals having been recorded by changing the domain length.

The present invention is a method for recording with a magneto-optical recording medium having a recording layer and a reproducing layer formed as a layer on a substrate, comprising the step of: recording a signal onto one part of a unit domain length (1T).

An apparatus for recording a signal on a magneto-optical recording medium according to the present invention, comprising: a modulating means for modulating a record signal; a timing signal creating means for creating a first timing signal based on the record signal modulated by the modulating means; and a magnetic field applying means for applying one period of an alternating magnetic field to a unit domain length in response to the first timing signal.

The physical length for recording a unit bit is taken as a unit domain length. In the case that the unit domain length is 1T, a signal "1" is recorded, for example, in 1T/2. More specifically, one period of an alternating magnetic field is applied to the magneto-optical recording medium during a time period of the unit domain length 1T. Accordingly, recording a signal "1" of 1T requires to record "1" in the former 1T/2 and "0" in the latter 1T/2. Recording a signal "0" of 1T requires to record "0" in both the former 1T/2 and the latter 1T/2. To record a signal "1" of 2T requires recording twice "1" and "0" alternately at a 1T/2 interval.

Because the substantial domain length is limited to 1T/2, the reproducing condition may be optimized only for the domain length of 1T/2. Also, there is less distribution of a leakage magnetic field through the domain, and there is reduction in an opposite directional leakage magnetic field that is formed at the outer side of the domain. Accordingly, it is possible to transfer and enlarge the magnetic domain to and within the reproducing layer in a sufficient extent.

According to the present invention, because the substantial domain length is taken short, even if the domain length is varied, the transfer and enlargement of the domain to and within the reproducing layer is made with sufficiency, thus realizing stable reproduction. Because the domain length is limited to one kind, it is possible to widen a margin for the reproducing condition.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a conventional method to reproduce magnetic domains recorded in a recording layer of the magneto-optical recording medium of FIG. 1, wherein FIG. 2(A) is before enlargement while

FIG. 5 is an illustrative view showing typically a leakage magnetic field occurring in a reproducing layer in the conventional part of FIG. 4, wherein

FIG. 13(A) is an illustrative view showing one example of domains created according to the conventional art while FIG. 13(B) is an illustrative view showing one example of domains created according to the embodiment of the present invention.

DETAILED DESCRIPTION OF THE PREFERRED EMBODIMENTS

Figure 6:
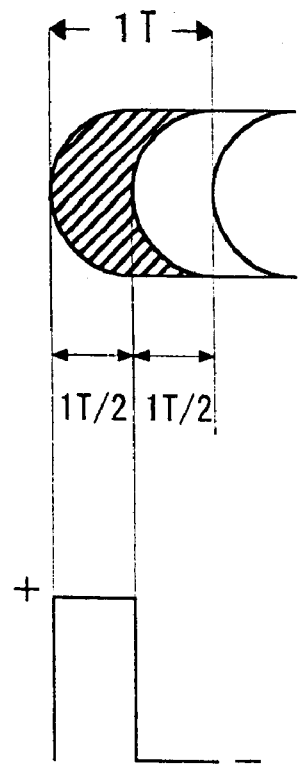
FIG. 6 is an illustrative view showing a domain to record "1" in a unit domain length according to the present invention.
Figure 9:
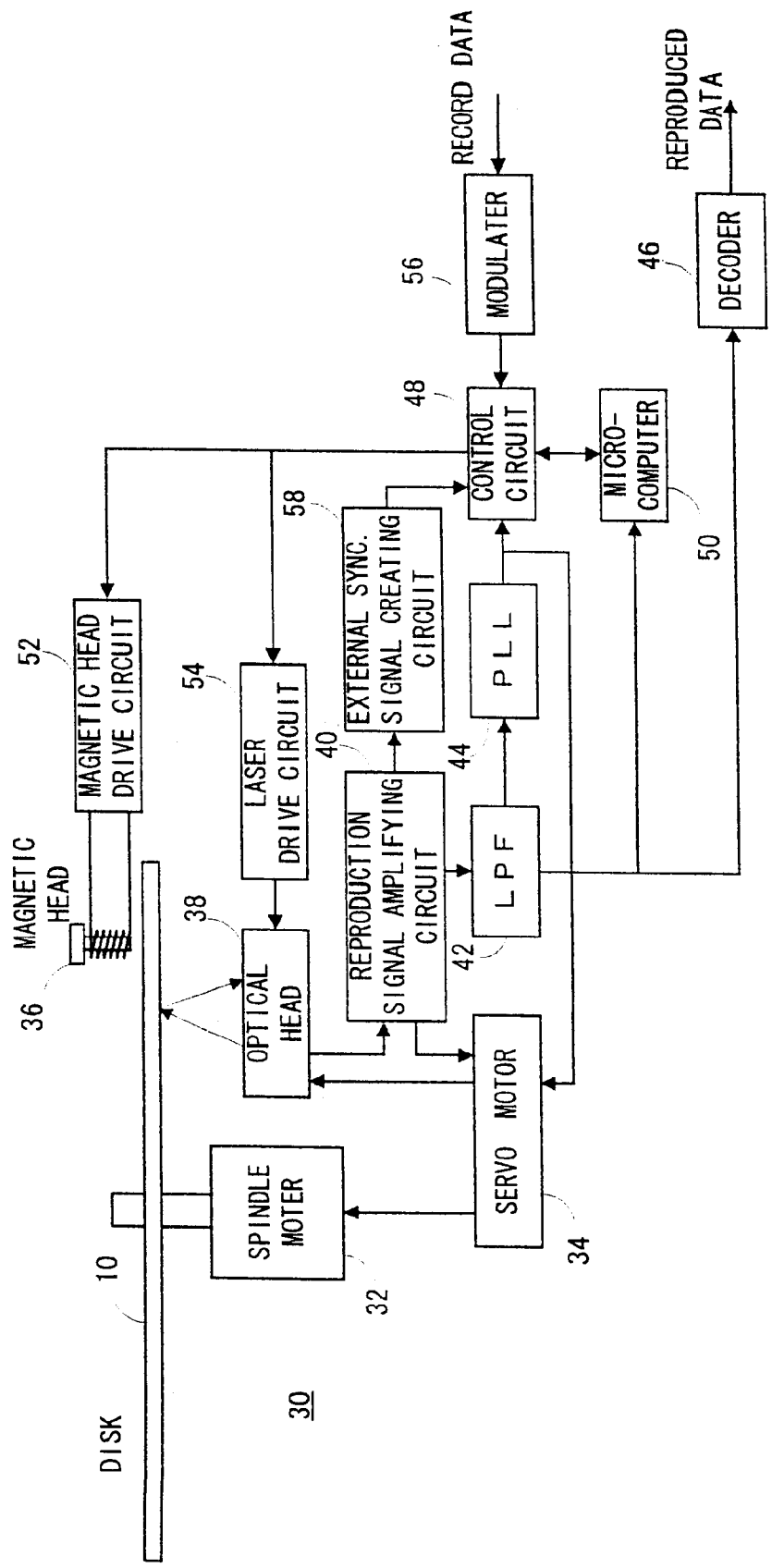
FIG. 9 is a block diagram demonstrating one embodiment of the present invention.

FIG. 6 illustrates a method to record a signal "1" onto a unit domain length 1T. In this invention, the unit domain length is divided to record "1" in the former half and "0" in the latter half of the divided domain. In this case, a "+" magnetic field is applied to the former 1T/2 while a "−" magnetic field is to the latter 1T/2 by applying one period of an alternating magnetic field onto the unit domain length 1T through using a magnetic head 36 (FIG. 9).

Figure 7:
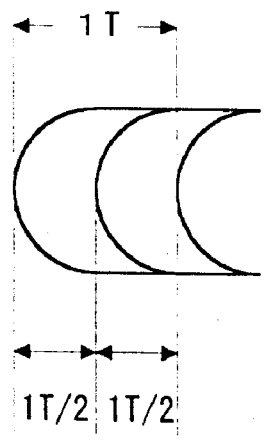
FIG. 7 is an illustrative view showing a domain to record "0" in the unit domain length according to the present invention.

FIG. 7 similarly illustrates a method to record a signal "0" onto the unit domain length 1T, wherein "0" is recorded in a former half and "0" is in the latter half of the divided domain.

Figure 8:
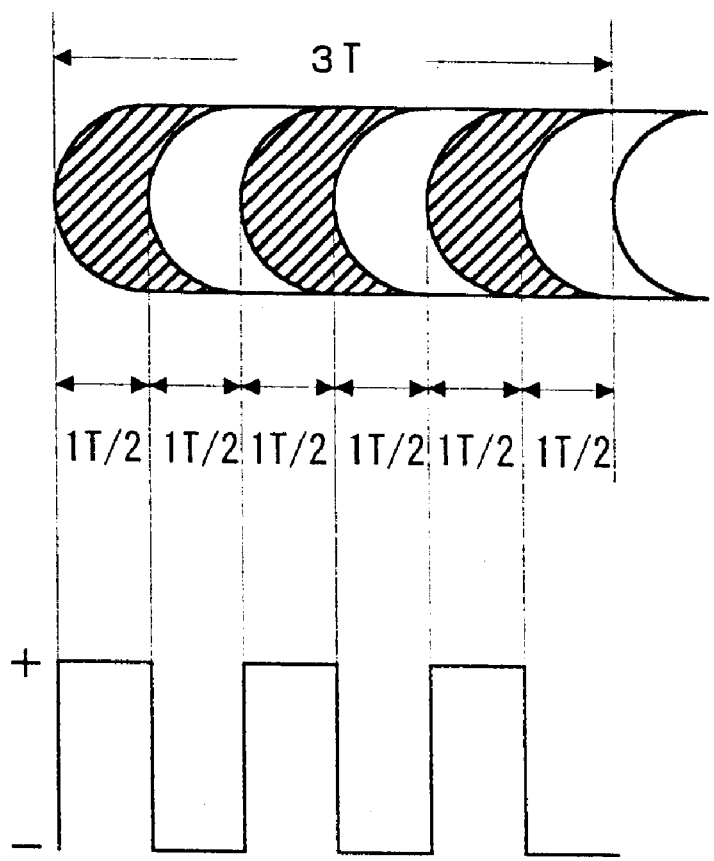
FIG. 8 is an illustrative view showing domains to record "1" in a domain length of 3T according to the present invention.

FIG. 8 depicts a method to record a signal "1" within a domain length 3T. In this invention, "1," and "0" are alternately recorded at an interval of 1T/2. That is, the domain length 3T is divided into six portions each having a domain length 1T/2, thus making recording as "1", "0", "1", "0", "1" and "0". In also this case, one period of an alternating magnetic field is applied to each unit domain length 1T.

Note that the length 1T/2 corresponds to a physical length of 0.08 $\mu$m on the magneto-optical recording medium 10. The magneto-optical recording medium, if having a diameter of 12 cm, can afford to record signals as much as 10 to 12 giga-bytes.

Figure 1:
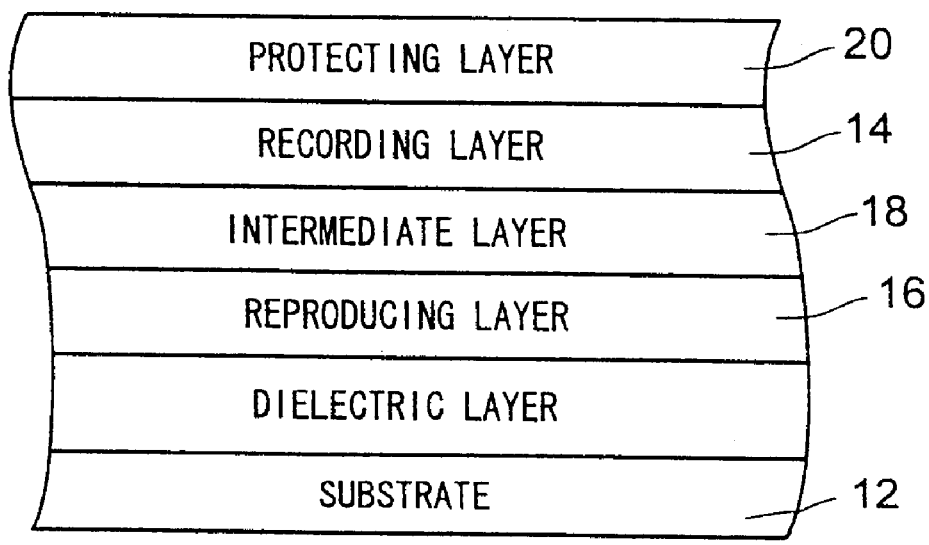
FIG. 1 is a sectional illustrative view showing one example of a magneto-optical recording medium used in the present invention.
Figure 2A:
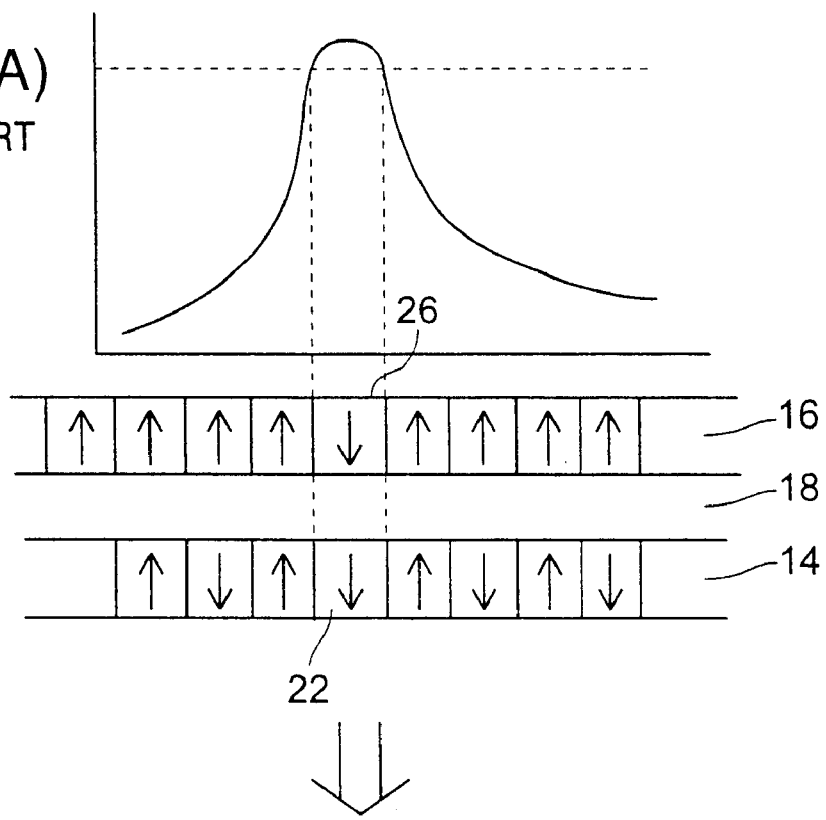
Figure 2B:
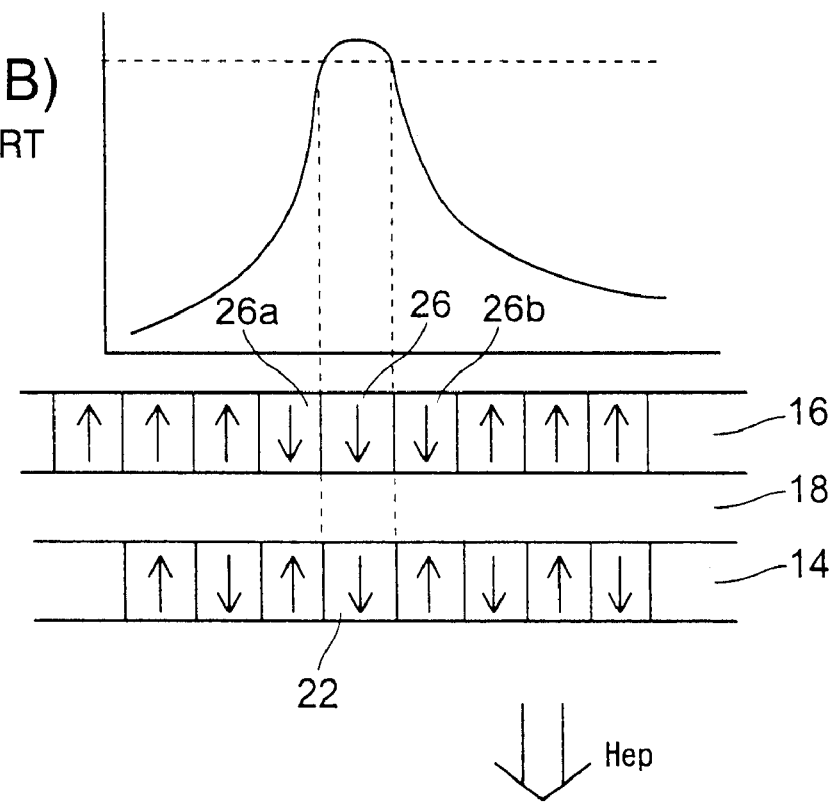
FIG. 2(B) is after the enlargement.
Figure 3:
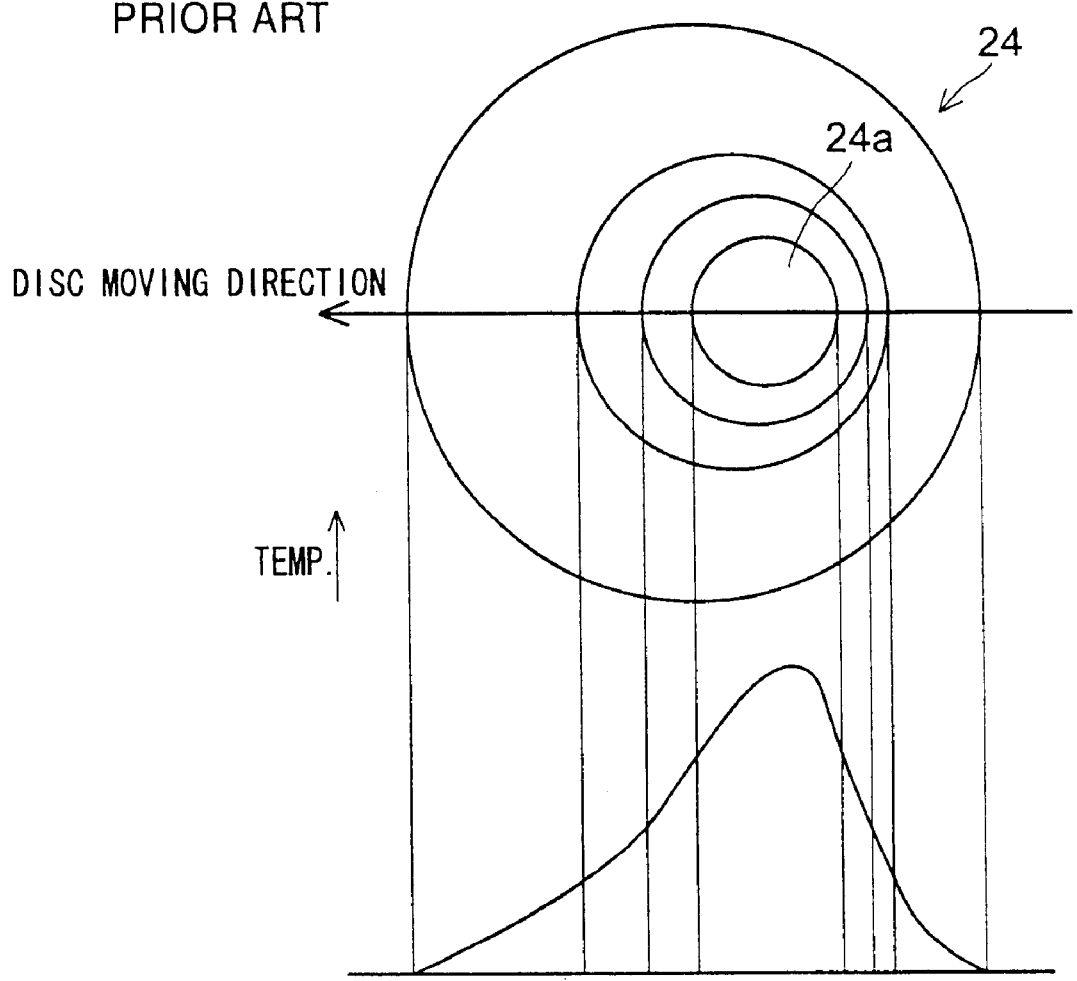
FIG. 3 is an illustrative view showing a light spot with temperature distribution given by a laser beam irradiated upon reproducing with a magneto-optical recording medium.
Figure 4:
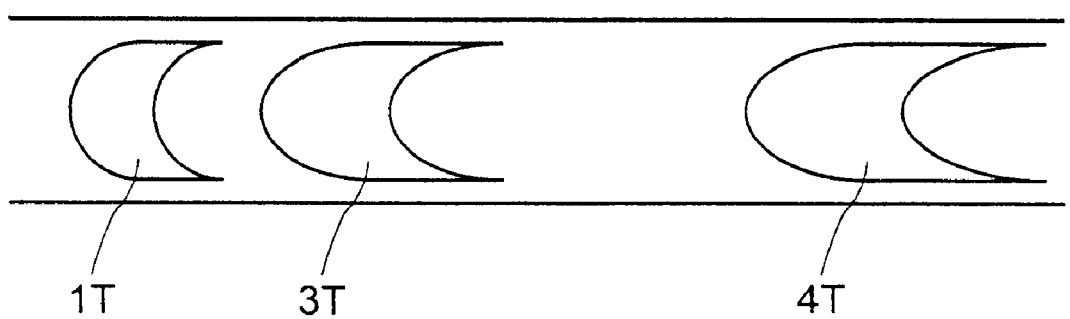
FIG. 4 is an illustrative view showing a conventional high density recording method having domains varied in length.
Figure 5A:
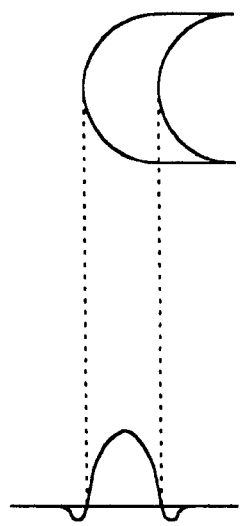
FIG. 5(A) illustrates a case of a short domain length while FIG. 5(B) a case of a long domain length.
Figure 5B:
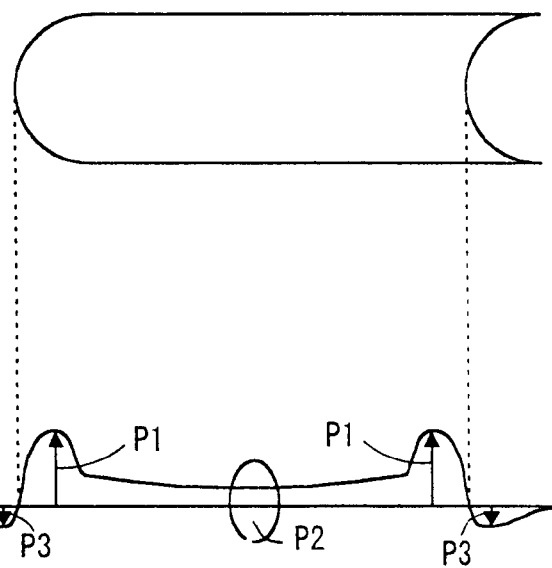

Referring to FIG. 9, a record reproducing apparatus 30 applicable for the magneto-optical recording medium of this embodiment includes a spindle motor 32 to rotate a magneto-optical recording medium or disc 10. The spindle motor 32 is controlled by a servo circuit 34. A magnetic head 36 is provided above the magneto-optical recording medium or disc 10, in a manner out of contact with the disc 10. An optical head 38 is arranged below the disc 10 in a manner out of contact with the disc 10. The magnetic head 36 is utilized not only to create record magnetic domain 22 (FIG. 2) within a recording layer 14 (FIG. 1) of the disc 10 as referred to later, but also to apply an alternating magnetic field in order to extend a magnetic domain 26 that has been transferred to the reproducing layer 16. The optical head 38 includes, as well known, a laser element, a light detecting element and a polarized light beam splitter. The laser element (not shown) is to irradiate a laser beam to the magneto-optical recording medium or disc 10 during reproduction, as stated before. Two light detecting elements, e.g., photodiodes, serve to detect respective ones of reflection light different in polarization axis in accordance with a magnetization polarity of the record magnetic domain or transferred magnetic domain (enlarged magnetic domain), thereby outputting a reproduction signal (RF signal).

The reproduction signal by the optical head 38 is supplied to a reproduction signal amplifying circuit 40. The reproduction signal amplifying circuit 40 supplies tracking error and focus error signals contained in the reproduction signal to the servo circuit 34. The servo circuit 34 in turn controls the spindle motor 32 to rotate at a predetermined rotational speed in response to the tracking and focus signals as well as a clock signal (to be referred to later). The servo circuit 34 also controls an objective lens (not shown) included in the optical head 38. That is, the servo circuit 34 performs tracking servo and focus servo controls.

The reproduction signal amplified by the reproduction signal amplifying circuit 40 is removed of noise components by a low-pass filter 42, and then supplied to a PLL (Phase-Locked Loop) 44 serving as a clock generating circuit as well as to a decoder 46. The PLL 44 makes adjustments on phase and frequency of an oscillation clock based on a phase comparison between a reproduction clock contained in the reproduction signal and an oscillation clock given from VCO (Voltage-Controlled Oscillator; not shown), thereby outputting an oscillation clock as a system clock. This system clock is supplied to the servo circuit 34 as stated before, and also to a control circuit 48 and to the decoder 46.

The decoder 46 decodes an output signal (reproduction signal) supplied from the low-pass filter 42, thus outputting reproduction data.

The control circuit 48 controls a magnetic head drive circuit 52 and a laser drive circuit 54. The laser drive circuit 54 effects driving the laser element (not shown) included in the optical head 38, depending upon a signal given from the control circuit 48.

The magnetic head drive circuit 52 includes a record pulse signal source (not shown) for generating a pulse signal to write record magnetic domain into the recording layer 14 (FIG. 1), and a reproduction pulse signal source (not shown) for causing the magnetic head 36 to generate an alternating magnetic field. That is, the control circuit 48 is supplied with modulated record data from a modulator 56 so that the control circuit 48 applies a signal to the magnetic head drive circuit 52 in accordance with the modulated record data. In response, the magnetic head drive circuit 52 controls the pulse signal sources to supply a drive signal to the magnetic head 36 so that magnetic domains can be recorded within the recording layer of the magneto-optical recording medium or disc 10 in accordance with the record data.

Figure 10:
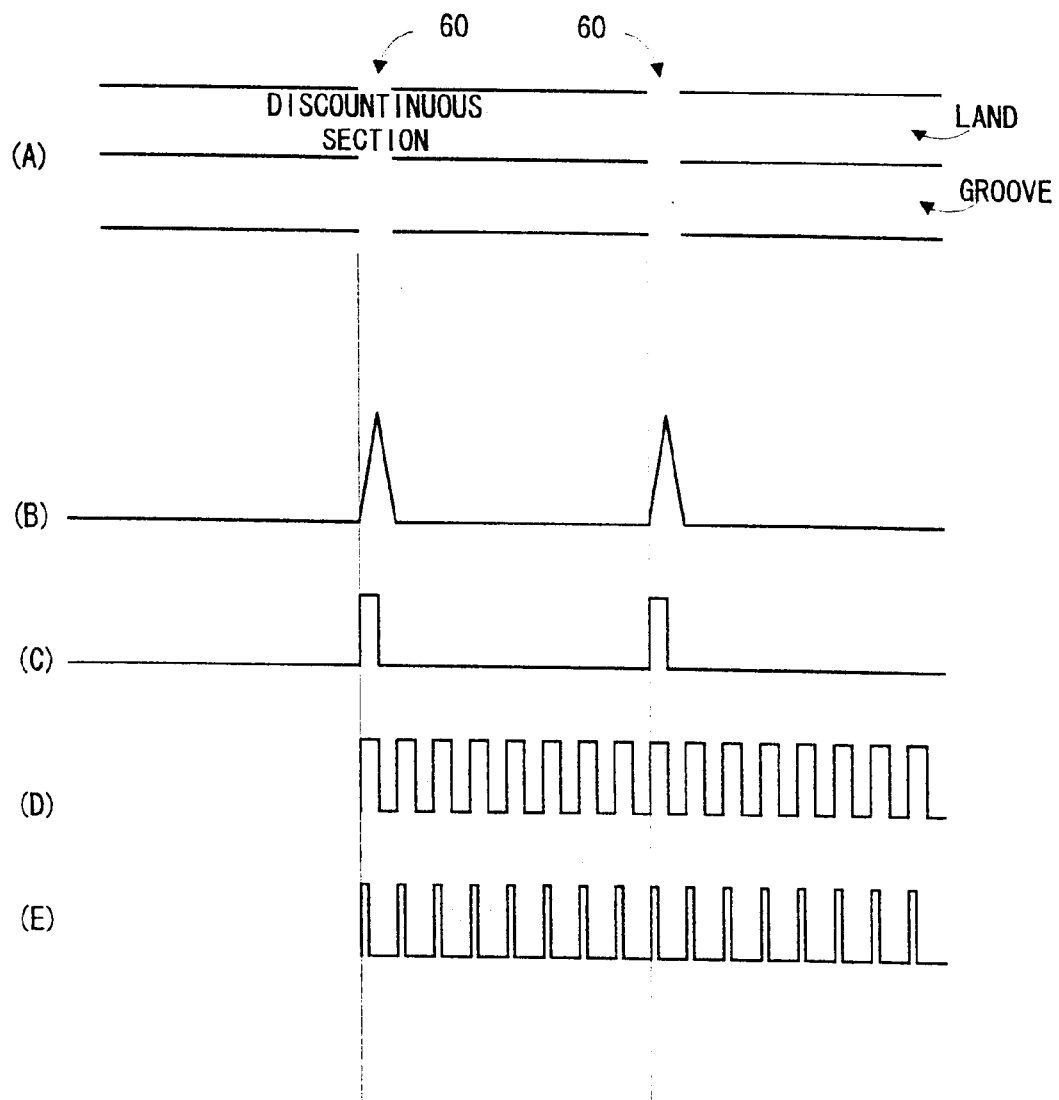
FIG. 10 is a timing chart showing the operation of an external synchronous signal creating circuit in the FIG. 9 embodiment.

Explanations will be made hereunder on the drive timing to the optical head 38 and the magnetic head 36 in the case where a signal or signals are recorded in each part of a unit domain length 1T, e.g., 1T/2. As shown in FIG. 10(A), the magneto-optical recording medium or disc 10 is formed with a land/groove schemed track. The track includes discontinuous sections 60 formed at a predetermined interval without grooves. At the discontinuous section 60, the optical head 38 or reproduction signal amplifying circuit 40a outputs a signal as shown in FIG. 10(B). This signal is supplied to an external synchronous signal creating circuit 58. The external synchronous signal creating circuit 58 causes a comparator (not shown) to compare the reproduction signal with a difference voltage, and outputs a pulse signal as shown in FIG. 10(C). This pulse signal is supplied to the control circuit 48. The control circuit 48 supplies a pulse signal, as shown in FIG. 10(E), to the laser drive circuit 54 and the magnetic head drive circuit 52 in accordance with the record data given from the modulating circuit 46, in synchronism with the system clock from the PLL 44 and the pulse signal. In response to this pulse signal, the laser drive circuit 54 makes driving to the laser element (not shown) of the optical head 36 while the magnetic head drive circuit 52 drives the magnetic head 36.

In this manner, the present embodiment effects driving to the optical head 38 and the magnetic head 36 at an interval of 1T/2 based on the external synchronous signal obtained from the external synchronous signal creating circuit 58.

Figure 11:
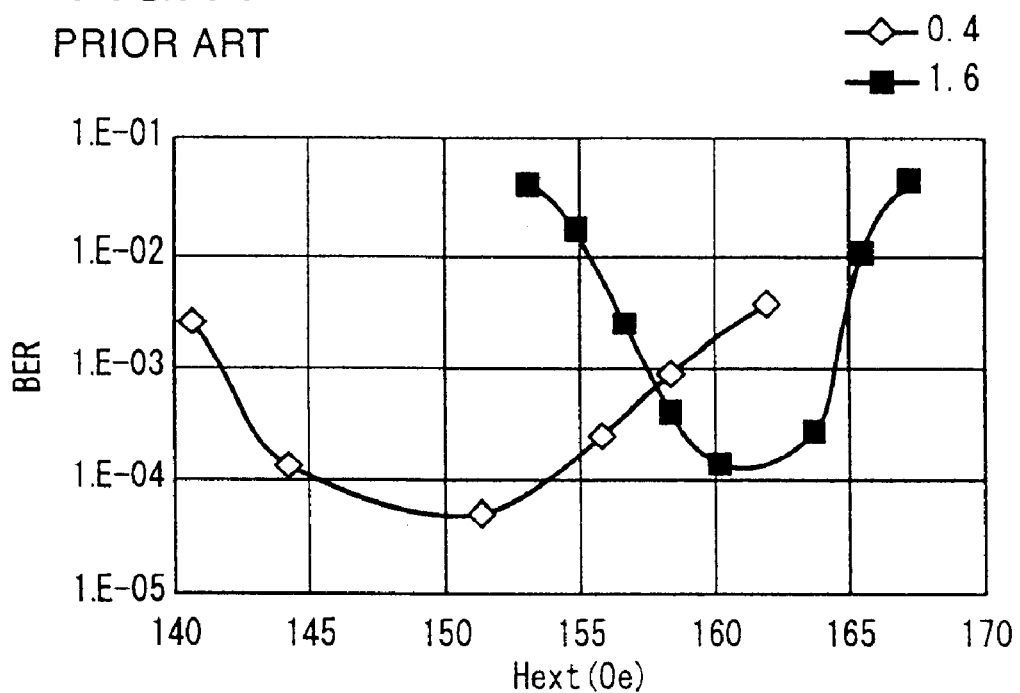
FIG. 11 is a graph showing a bit error rate against an intensity of an external magnetic field when recording according to the conventional part.

Now the results of the experiments conducted by the present inventors will be explained with reference to FIG. 11 to FIG. 13. FIG. 11 demonstrates a reproduction characteristic (actual measurement values) of the signals recorded onto domains continuously created as shown in FIG. 13(A). In this graph, the vertical axis represents a bit error rate (BER) while the horizontal axis denotes a peak value (Oe) of an alternating magnetic field applied for reproduction. For example, the value "150 (Oe)" on the horizontal axis represents that an alternating magnetic field of +−150 (Oe) is applied to reproduce a signal. Meanwhile, the white square (◇) denotes a reproduction characteristic of a domain in a size of 0.4 $\mu$m and the black square (■) shows a reproduction characteristic of a domain in a size of 1.6 $\mu$m. Note that, when the domain length is 1.6 $\mu$m, the interval between the domains is also at 1.6 $\mu$m.

Figure 12:
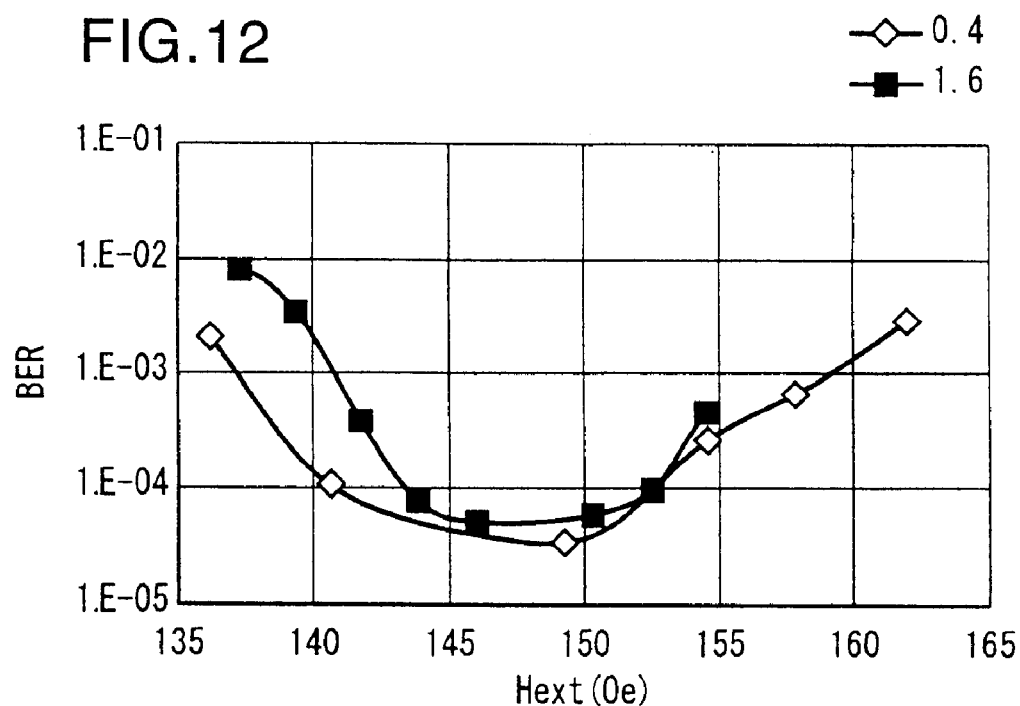
FIG. 12 is a graph showing a bit error rate against an intensity of an external magnetic field when recording according to the embodiment of the present invention.

FIG. 12 is a graph representing a reproduction characteristic in a case where a signal recordation and reproduction are made according to the embodiment of the present invention as shown in FIG. 13(B).

From the comparison between FIG. 11 and FIG. 12, it can be seen that the magnetic field required for reproduction can be reduced by recording the signal according to the embodiment of the present invention, as compared with the method of the conventional art. Furthermore, the shorter domains and the longer domains can both be reproduced by a same intensity of a reproducing magnetic field. In addition, it is also possible to reduce, although somewhat, the bit error rate. It was confirmed by these experiments by the present inventors that the present invention is well suited as a method to record signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for recording with a magneto-optical recording medium having a recording layer and a reproducing layer formed as a layer on a substrate, comprising the steps of:

(a) recording a signal onto one part of a unit domain length (1T), wherein said one part in said step (a) is shorter than ½ of said unit domain length, and wherein step (a) includes a step of applying one period of an alternating magnetic field to said unit domain length.

* * * * *